United States Patent

Ule

[15] 3,696,286

[45] Oct. 3, 1972

[54] SYSTEM FOR DETECTING AND UTILIZING THE MAXIMUM AVAILABLE POWER FROM SOLAR CELLS

[72] Inventor: Louis A. Ule, Rolling Hills, Calif.

[73] Assignee: North American Rockwell Corporation

[22] Filed: Aug. 6, 1970

[21] Appl. No.: 61,570

[52] U.S. Cl. ..........................323/15, 307/66, 320/40
[51] Int. Cl. ..............................G05f 1/62, H02j 7/34
[58] Field of Search ........307/48, 66; 320/15, 39, 40; 325/15

[56] References Cited

UNITED STATES PATENTS

| | | | |
|---|---|---|---|
| 3,489,915 | 1/1970 | Engelhardt | 307/66 |
| 3,222,535 | 12/1965 | Engelhardt | 307/66 |
| 3,350,618 | 10/1967 | Barney et al | 307/66 |
| 3,419,779 | 12/1968 | Zehner | 320/40 X |

*Primary Examiner*—A. D. Pellinen
*Attorney*—L. Lee Humphries, Charles F. Dischler and Dominick Nardelli

[57] ABSTRACT

In a power solar cell array consisting of many solar cells connected to deliver useful electrical power, there is imbedded a smaller reference solar array consisting of solar cells connected in series with a Zener diode and load resistor so devised that the voltage that appears across the load resistor is equal to or a constant fraction of the voltage at which the power array, operating at the same temperature and solar exposure as the reference array, delivers maximum electrical power. The voltage difference between the large solar array or the given fraction thereof and the reference solar array is used directly as means to constrain the large array to operate at the voltage of maximum power, typically any excess power being used to charge a storage battery.

4 Claims, 5 Drawing Figures

INVENTOR.
LOUIS A. ULE

BY Dominick Nardelli

ATTORNEY

INVENTOR.
LOUIS A. ULE
BY Dominick Nardelli
ATTORNEY

SYSTEM FOR DETECTING AND UTILIZING THE MAXIMUM AVAILABLE POWER FROM SOLAR CELLS

FIELD OF INVENTION

This invention relates to apparatus for utilizing the maximum available power from a solar array subject to variations in temperature and solar illumination.

DESCRIPTION OF THE INVENTION

The voltage, at which a solar cell or a photovoltaic array, delivers maximum power is strongly dependent on solar cell temperature and dependent to a lesser degree on the intensity of illumination. In a typical application of a solar cell array to provide electrical power, the temperature may range from minus 70° to plus 70° centigrade, and the maximum voltage may range from two to one between the end points of the temperature range. Typically, the operating voltage of the array is constrained to its lower value so that there are times when as much as one half of the power is irretrievably lost. The prior art suggests ways for sampling whether a solar array is delivering maximum power by means of a periodic variation or dither induced in the power delivered by the array so that the voltage at which maximum power is delivered may be detected. Such means, of detecting the point of maximum power, require a watt-meter device which must be able to respond at the dither frequency so that, in effect, the frequency must be quite low and therefore difficult to isolate from the useful electrical load. The low dither frequency further requires a feedback servomechanism of even slower response. Thus, the disadvantages of such means are readily apparent.

Therefore an object of this invention is to provide a more reliable, efficient and simpler system to ensure that maximum power is being coupled from the solar cell array.

Another object of this invention is to provide a system for detecting and utilizing maximum available power which system does not interrupt or modulate the continuous supply of power to the load.

Other objects and features of advantage of this invention will become more apparent in the following detailed description of the preferred embodiment of the invention when studied together with the drawings, wherein.

Figure 4:
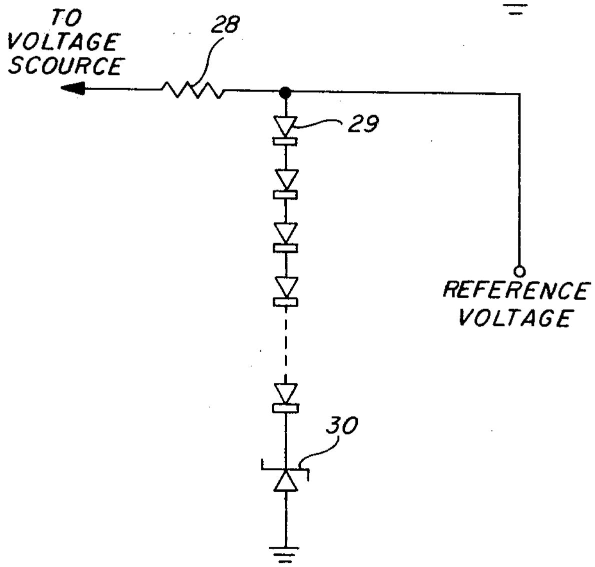
Figure 5:
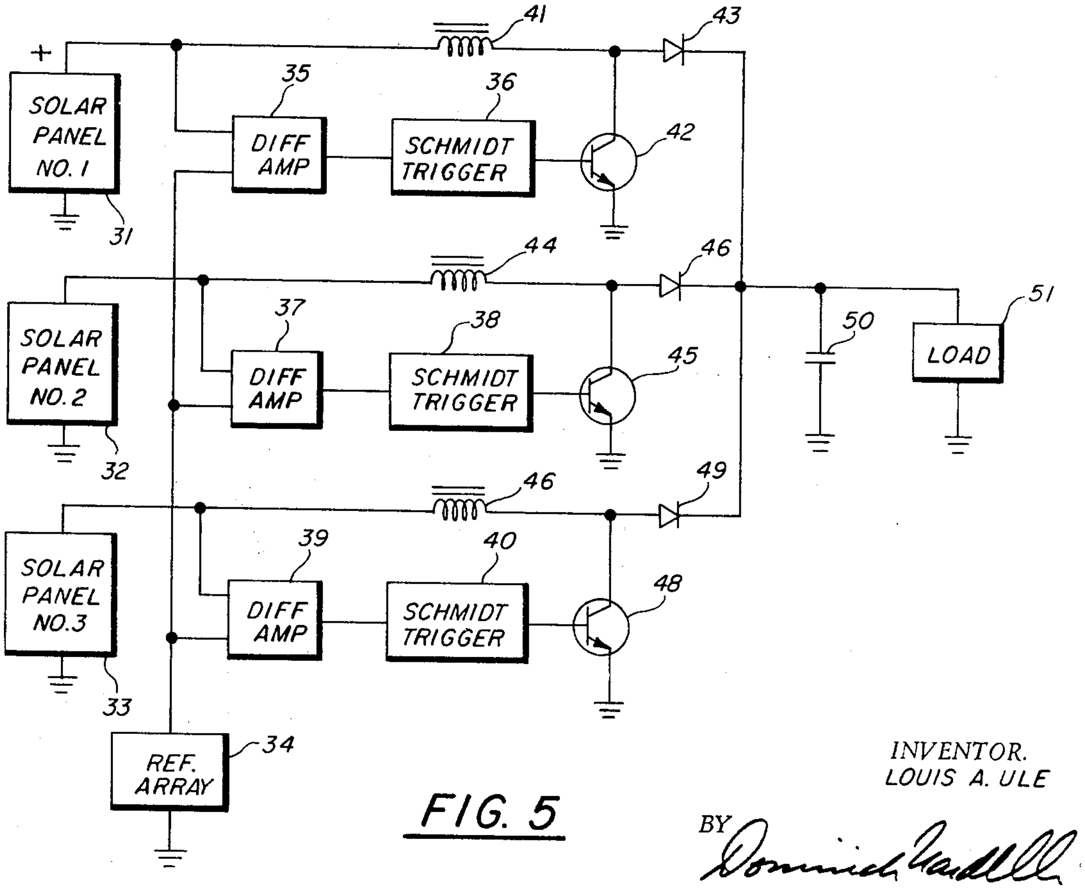

FIG. 4 is a schematic of another embodiment showing a simulated solar reference array in which the silicon solar cells are replaced by silicon diodes not exposed to the sun but energized from a separate power source to produce a voltage having a known relationship to the voltage at which the large solar array would deliver maximum power; and FIG. 5 is a block diagram of a system which operates several independent solar cell arrays each at maximum power by means of a single reference voltage.

Figure 1:
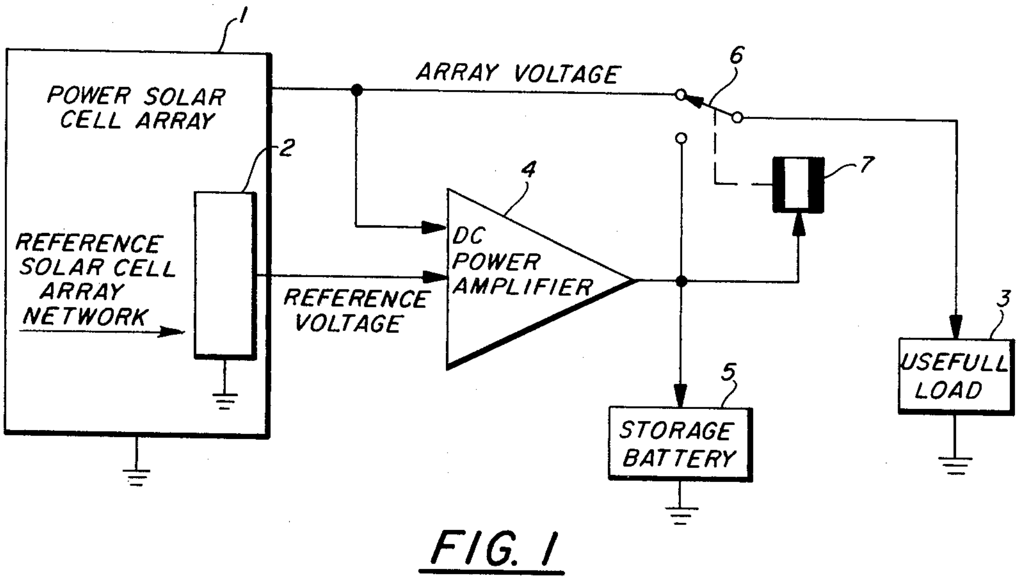
FIG. 1 is a block diagram of one embodiment employing the novel system for utilizing maximum available power from a solar cell array.

Referring to FIG. 1, a main-power solar cell array 1 which has many standard solar cells to produce a voltage, referred to hereinafter as the power or usable voltage, is constrained to operate at maximum power output by means of a novel device preferably in the form of a reference solar cell array network 2 which produces a reference voltage. A DC (direct current) power amplifier 4 amplifies the voltage difference between the power and reference voltages to produce on its output lead, another voltage of proper polarity and value to charge the storage battery 5. The gain of the power amplifier 4 is made sufficiently large so that a small positive deviation of the array voltage from the reference voltage is amplified to a value sufficient to increase the current delivered to the battery to the point where the added load of charging the battery will lower the power array voltage to the desired value. On the other hand, if the power array voltage is below the reference voltage, the output of the DC power amplifier 4 is decreased and thereby reduces the amount of power drawn from the array and raises its voltage to the value which again produces maximum power from the array. The DC amplifier 4 is conventionally designed to only draw power to charge the battery only from the power solar cell array 1. When the power solar cell array does not produce sufficient power for the required useful load, a conventional means including a solenoid 7 responsive to the output voltage may be employed to position the switch 6 to connect a useful load 3 to the battery 5.

Figure 2:
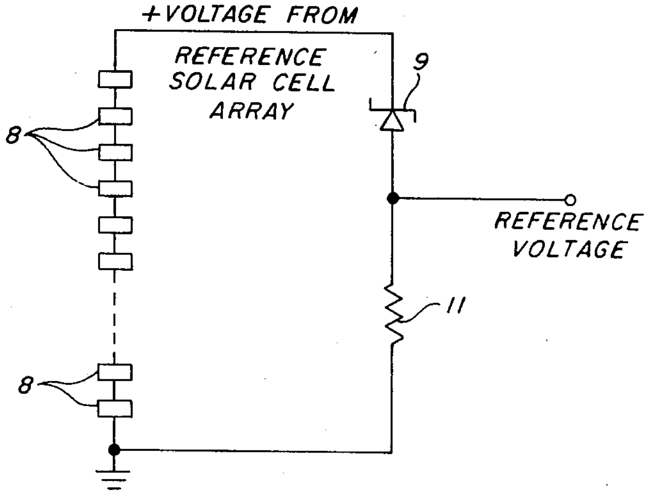
FIG. 2 is a schematic of the reference solar cell array network of FIG. 1 which produces a voltage equal or related to the voltage at which the large solar array would deliver maximum power.

FIG. 2 shows the reference solar cell array network 2 comprised of several solar cells 8 connected in series, a Zener diode 9, and a load resistor 11, all of which will closely reproduce the voltage at which the power solar array, exposed to the same environment, will deliver maximum power. This electrical network preferably should produce a fixed fraction of the voltage at which the larger array delivers maximum power so that the reference solar array would need fewer solar cells in series. However, for purposes of explaining the invention, the voltage output of the network will be assumed as being equal to the optimum voltage that the main power array 1 should have to produce maximum power. For purposes of reliability, several such reference series strings may be connected in parallel so that, if any of the series strings fail by an open circuit (the more probable mode of failure), the output voltage of the reference array is unaffected since the resistor 11 has a resistance value large enough so that the solar cells operate essentially at their open circuit voltage.

As mentioned before, the principal factor which governs the voltage at which a solar cell array 1 delivers maximum power is the array temperature and the secondary factor is the effect due to the intensity of solar illumination. This principal factor is taken in account within the network of FIG. 2 by special means because the rate of change of the open circuit voltage of solar cells with temperature is slightly different than the rate of change of the voltage of maximum power with temperature and further because the voltage of maximum power is lower than the open circuit voltage. The special means is determined as follows: For example, since the rate of change of the voltage of maximum power (for two ohm-cm N on P solar cells) is about 0.947 of the range of change of the open circuit voltage with temperature, the number of solar cells in series in the reference solar array will be about .947 of the number of those in a series string of solar cells in the power solar cell array 1. Further, since the open circuit voltage of even these fewer solar cells 8 will exceed the voltage of maximum power for the large solar cell array 1 by a constant value, the voltage of the reference array is reduced the necessary amount by means of the Zener diode 9 and load resistor 11. For two ohm-cm type N on P solar cells, the voltage of the Zener diode will be equal to the voltage produced by .116 times the number of solar cells in series in the power solar cell array 1. Thus, for example, if the power solar cell array 1 is comprised of parallelly-connected series strings, each string having 80 N on P solar cells in series, the number of solar cells in the reference array will be .947 of the 80 cells or 76 cells connected in series. The voltage of the Zener diode would be selected as $.116 \times 80$ or 9.28 volts since the 80 series string of solar cells produces 80 volts. In this manner, the voltage of the reference array may be made to closely match the voltage of maximum power of the large array over a temperature range from minus 150° to plus 150° centigrade. As mentioned before, the reference solar cell array network 2 to function properly must be imbedded in the large cell array in a position where it will experience the same illumination and operate at the same temperature as the large array. In this manner, small effects due to the intensity of solar illumination are fully reflected in the output of the reference solar array.

Figure 3:
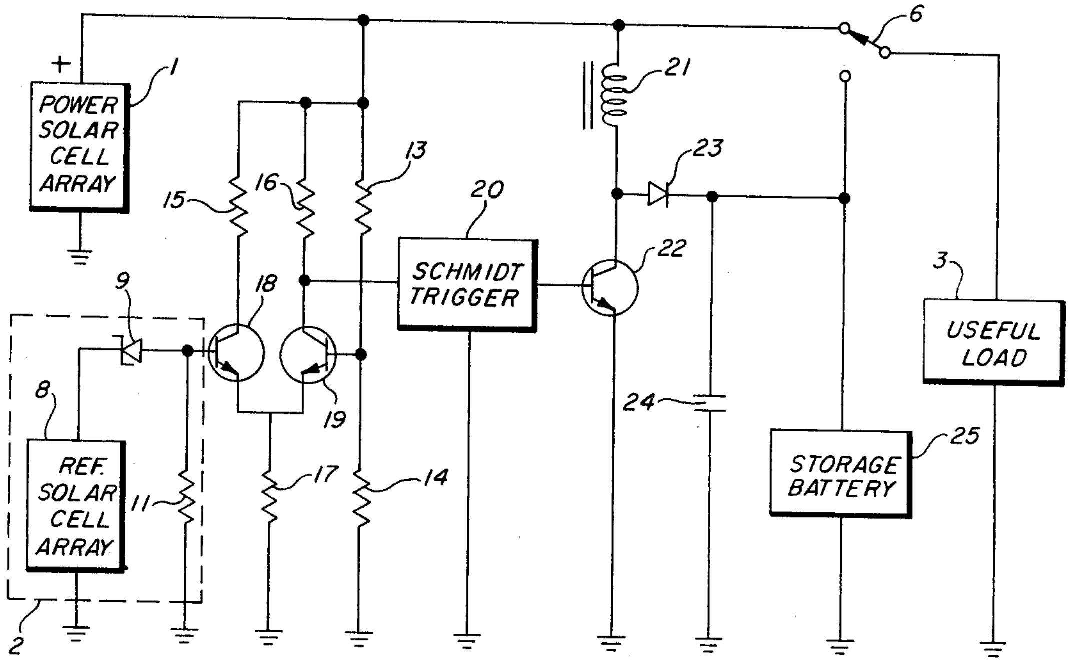
FIG. 3 is a more detailed schematic of a typical solar cell power system shown in block diagram form in FIG. 1.

FIG. 3 exhibits a practical schematic embodiment of the block diagram of FIG. 1 wherein the DC amplifier 4 of FIG. 1 is shown as a differential amplifier driving a Schmidt trigger 20 which in turn controls a pulse-modulated boost battery charger. The differential amplifier consists of transistors 18 and 19 with two collector load resistors 15 and 16 and a common emitter resistor 17. One voltage input to the differential amplifier is provided by the reference network 2 which, as mentioned before, could be equal to or a fixed fraction of the optimum power voltage. In this circuit, the reference voltage is, for example, one-half of the optimum power voltage. Then the second input to the differential amplifier is provided by one-half of the power voltage by means of the voltage divider network comprised of resistors 13 and 14, to make this voltage equal to the reference voltage.

Any deviation of the produced power voltage is therefore amplified by the differential amplifier and appears in amplified form as the voltage at the junction of the collector of transistor 19 and the resistor 16. This voltage is further amplified by means of a Schmidt trigger 20 to the extent that the output of the Schmidt trigger is either a negative current or is a positive current which drives the base of a power switching transistor 22. Should the large solar array voltage be too high, the output of the Schmidt trigger will be a positive current which will cause transistor 22 to conduct and essentially connect the inductor 21 across the power solar cell array 1. As the current in the inductor 21 rises, the voltage of the solar array 1 will drop and continue to do so until it falls below the voltage of maximum power. At this point, the output current of the Schmidt trigger will abruptly become negative and cause transistor 22 to become nonconducting. Thereupon the inductor 21 becomes again connected between the large solar array and the battery, and, since the inductor cannot stop conducting abruptly, it will draw current from the large solar cell array and force it into the battery (because of the reversed voltage across the inductor, a boost battery charger is shown as an example so that the battery charging voltage exceeds the solar cell array voltage). The current in the inductor 21 therefore decreases to a point where the reduced load on the power solar cell array again causes its voltage to rise above the maximum power value so that the on-off cycle of transistor 22 is repeated. The inductor 21 has an inductance small enough so that the switching rate of the transistor 22 is several hundred to several thousand hertz and therefore only slight fluctuations of voltage ensue.

The inductor 21, switching transistor 22, diode 23, and the capacitor 24 are the essential components of a conventional switching boost voltage regulator, here used to charge the battery 25 at exactly that rate which uses or scavenges any electrical power capable of being produced by the large solar cell array 1 and not required by the useful load 27. If the power output of the power array 1 is insufficient for the useful load 3, conventional means 7 (mentioned above) are used to position the switch 6 so as to connect the load to the storage battery 25. Even in this latter position of the switch 6, any power, capable of being delivered by the array, is still diverted to the useful load directly through the battery charger components, so that full scavenging of electrical power from the power solar array 1 is effected whether or not the array is connected directly to the useful load 3 or through the inductor 21 and diode 23. In the event the battery has reached full charge, conventional means (not shown) may be employed to discontinue charging of the battery 25.

There are occasions where even a small solar cell reference array would infringe unduly upon the area available for the power solar cell array. In this event, the solar cells in the reference voltage network could be replaced by silicon diodes. As is well known in the art, a solar cell is a silicon diode whose junction is exposed to sunlight to produce a positive voltage on the positive junction so that a portion of the current produced flows back through the solar cell diode itself and this reverse current together with the voltage current characteristic of a silicon diode, which depends on temperature, is responsible for the open circuit voltage of a solar cell in sunlight. A voltage similar to the reference voltage of FIG. 2 may be produced by applying a small current in the forward direction across a silicon diode having characteristics of a solar cell. Referring to FIG. 4, if a series string of silicon diode 29 be forward biased from a voltage source through a large resistance 28 and if this series string of diodes be maintained at the same temperature as a solar cell array, the voltage drop across the series network of diodes 29 would be proportional to the voltage at which the solar cell array delivers maximum power. By selecting the required number of diodes in series and by means of a Zener diode 30 similar in function to Zener diode 9 of FIG. 2, the voltage drop across diodes 29 and 30 can be made to reproduce very closely the voltage, or a fixed fraction thereof, at which the solar cell array 1 delivers maximum power. The network of FIG. 4 can be substituted for the reference solar cell array network 2 of FIG. 1. Further, the diode reference network of FIG. 4 is particularly advantageous for solar power systems having many solar panels oriented in different directions because a single voltage reference for all panels would be sufficient.

Referring to FIG. 5, illustrated is the application of a diode type voltage reference network 34 which is similar to the circuit shown in FIG. 4 to the control of any number of solar cell panels 31, 32, and 33 so that they deliver the maximum power that each is capable of to a common load 51. A further advantage of the circuit of FIG. 5 is that isolation diodes, necessary to prevent current flowing from an array exposed to sunlight into an inactive array which is not so exposed, are not required, their function being assumed by flyback diodes 43, 46, and 49 of the three boost regulator circuits. The reference network 34 is so placed in the satellite or among the solar panels that it is maintained at the same or on an average temperature of the solar panels. The three differential amplifiers 35, 37, and 39 each have as one of their inputs the common reference voltage from network 34 and a voltage equal to the actual voltage (or a fixed fraction thereof) of the respective solar panels 31, 32, and 33. If these separate panels are designed, for reasons of using all available area exposed to sunlight, to operate at different voltages, suitable voltage dividers matched to each panel may be used to provide input voltages for the differential amplifiers 35, 37, and 39. Inductors 41, 44, and 46 operate exactly as does inductor 21 of FIG. 3 and the other elements of the conventional boost regulator circuits, namely, transistors 42, 45, and 48 and diodes 43, 46, and 49 operate exactly as do their respective counterparts 22 and 23 of FIG. 3. The three boost regulator circuits, however, have a common output capacitor 50 corresponding to the capacitor 24 of FIG. 3. An embodiment, using many solar panels controlled by the single voltage reference diode network 34 to deliver a specified amount of power to a useful load 51 (rather than the maximum possible, as in this example) and the balance into an adventitious load, such as the storage battery 5 of FIG. 1, may be effected by shunting a shunt voltage regulator (not shown) across the load and by charging the battery (not shown) with any excess power rather than dissipating the excess in a dummy load. In the latter event, should the array of solar panels fail to deliver sufficient power for the useful load 51, it may be connected to the battery. The boost regulators (as in FIG. 3) may then scavenge any available power from any of the solar panels and deliver it to the load through the battery charger. In this condition of operation, the useful load derives part of its power from the battery and the balance from the solar panels through the battery charger.

What is claimed is:

1. A system comprising:

a plurality of first solar cells for providing a source of electrical power with a load voltage, a second means for providing a reference voltage related to the voltage at which the first solar cells should deliver maximum power, a first load coupled to said first solar cells, a second load for storing and making use of excess power from the first solar cells, a third means of comparing the load voltage with the reference voltage, a fourth means responsive to the said third means, for increasing the power to the said second load when said load voltage increases relative to the said reference voltage and for decreasing the power to the said second load when the said load voltage decreases relative to the said reference voltage, said second means comprising:

a plurality of second solar cells which are exposed to the same solar illumination and maintained at the same temperature as said first solar cells, and a Zener diode and a load resistor connected in series across said second solar cells, said load resistor having a value to draw sufficient current to operate the Zener diode at its constant Zener voltage under substantially all load conditions causing said reference voltage to be produced across said load resistor.

2. The system of claim 1 wherein said third means and said fourth means comprises:

a voltage divider circuit for making the ratio of said reference voltage to said maximum power output voltage one-to-one, a differential amplifier to which are coupled the voltages at said one-to-one ratio and which produces a voltage output proportional to the difference between two voltage inputs thereto, a Schmidt trigger which is driven by the output of the differential amplifier and produces positive and negative voltages depending on the sign of the voltage output of said amplifier, a power switching transistor to the base of which said positive and negative voltages are coupled to switch the transistor to the fully conducting state and to the fully nonconducting state, an inductor coupled between said first solar cells and said power switching transistor so that when said transistor is conducting said inductor is connected across said first solar cells, and a network comprising a diode, an energy storage capacitor, and said second load, said capacitor and second load being connected in parallel and said diode being connected to isolate said capacitor and second load from said first solar cells and to cause power from said first solar cells to flow through to said parallelly connected second load.

3. The system of claim 1 wherein:

said first solar cells are divided into a plurality of independent photovoltaic arrays each made of a plurality of solar cells, each array being subjected to different intensity of solar illumination, said second means producing said reference voltage which is related to the voltage of any one of said arrays which at the time should deliver maximum power, said third means and said fourth means comprises:

a voltage divider for each array for making the ratio of said reference voltage to said respective maximum power voltage one-to-one, a differential amplifier for each array to which are coupled the voltage from a respective one of said dividers and said reference voltage, a Schmidt trigger for each amplifier which trigger is driven by the output of said respective amplifier to produce positive and negative voltages depending on the sign of the voltage output of said respective amplifier, a plurality of transistors each having a base to which is coupled the output of a respective one of said triggers to cause the respective transistor to be conducting and non-conducting depending on the plurality of the voltage input to the base, an inductor coupled between a respective one of said arrays and a respective one of said transistors so that when said one transistor is conducting said inductor is connected across said respective array, a diode coupled to each junction formed by one of said inductors and one of said transistors to conduct current from said respective arrays to said first load, and a capacitor coupled across said first load.

4. A system which scavenges any excess power from a photovoltaic array supplying power to a useful load and a storage battery, said system comprising:

an inductance coupled between said array and said battery, a capacitor coupled in parallel with said battery and in series with said inductor, a transistor having its emitter-collector circuit coupled in parallel with said battery and capacitor and in series with said inductor, and means for sensing when said array is supplying below maximum power to said load and for producing a voltage signal to make said transistor conducting when said array is producing less than maximum power to cause some of the power from said array to be stored in said battery.

* * * * *